(12) United States Patent
Rank

(10) Patent No.: US 6,279,948 B1
(45) Date of Patent: Aug. 28, 2001

(54) METHOD AND SYSTEM FOR TRIGGERING AN AIRBAG

(75) Inventor: Johann Rank, Suenzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/421,366

(22) Filed: Oct. 19, 1999

(30) Foreign Application Priority Data

Oct. 23, 1998 (DE) .............................................. 198 49 027

(51) Int. Cl.⁷ ................................................... B60R 21/32
(52) U.S. Cl. .......................... 280/735; 280/742; 102/530
(58) Field of Search .................................. 280/736, 737, 280/741, 742, 735, 738; 102/530, 531, 704

(56) References Cited

U.S. PATENT DOCUMENTS

| | | | |
|---|---|---|---|
| 3,692,495 | * 9/1972 | Schneiter et al. | 102/532 |
| 3,761,112 | * 9/1973 | Usui et al. | 280/736 |
| 3,768,832 | * 10/1973 | Schmidt | 280/735 |
| 3,810,655 | 5/1974 | Pracher . | |
| 3,958,949 | * 5/1976 | Plantif et al. | 102/531 |
| 5,348,344 | * 9/1994 | Blumenthal et al. | 280/737 |
| 5,487,561 | * 1/1996 | Mandzy et al. | 280/741 |
| 6,076,468 | * 6/2000 | DiGiacomo et al. | 102/530 |
| 6,196,583 | * 3/2001 | Ruckdeschel et al. | 280/736 |

FOREIGN PATENT DOCUMENTS

| | | |
|---|---|---|
| 2131744B2 | 12/1971 | (DE) . |
| 4041049A1 | 7/1992 | (DE) . |
| 19602695A1 | 7/1997 | (DE) . |
| 19612581A1 | 10/1997 | (DE) . |

OTHER PUBLICATIONS

German Search Report, Jun. 21, 1999.

* cited by examiner

Primary Examiner—Kenneth R. Rice
Assistant Examiner—Lynda Jasmin
(74) Attorney, Agent, or Firm—Crowell & Moring LLP

(57) ABSTRACT

In a method and system for triggering an airbag provided with a gas generator controlled by a control device, coolant is introduced into the gas emerging from the gas generator in order to control the power developed by the gas generator as desired.

11 Claims, 1 Drawing Sheet

METHOD AND SYSTEM FOR TRIGGERING AN AIRBAG

BACKGROUND AND SUMMARY OF THE INVENTION

This application claims the priority of German application 198 49 027.5, filed in Germany on Oct. 23, 1998, the disclosure of which is expressly incorporated by reference herein.

The invention relates to a method and system for triggering an airbag provided with a gas generator controlled by a power control device.

Instead of airbags that have a gas generator that can be triggered once, preferably pyrotechnically, airbags are increasingly coming into use with gas generators whose performance can be controlled. The variation of the power of the gas generator serves to adapt the effect of the airbag to the seriousness of an individual accident. In particular, gas generators are used that can be triggered in stages. The performance of the gas generator over time can be varied by the time interval between the triggering stages.

A goal of the invention is to provide a method and system for triggering an airbag which ensures a protective effect of the airbag that is better adapted to a given accident or type of accident.

The invention achieves this goal by providing that a coolant is introduced as desired into the gas emerging from the gas generator in order to reduce the power developed by the gas generator.

In addition to or alternatively to the possibilities provided by the time curve of the power control unit that influences power development, additional variation of the power developed by the airbag is made possible by the invention. The maximum pressure can be varied by using a coolant. This applies both to the magnitude of the maximum pressure as well as the point in time at which this pressure maximum is reached. Power can be controlled for example in such fashion that excessive power development by the gas generator is compensated. In certain types of accidents that require less power to be generated by the airbag, the power can be adjusted to the requirements. For this purpose, power can be varied for example for an airbag that can be triggered in stages in such fashion that the beginning and/or end of the introduction of the coolant is varied accordingly. In addition, the action of the gas generator can be weakened by varying the quantity of coolant. In particular, the combination of a gas generator that can be triggered in stages with the possibility of varying the time intervals of the stages and with the influence of ambient temperature on the action of the gas generator and the variation of the coolant flow as regards beginning, duration, quantity, and change in quantity results in ideal adjustment of the action of the airbag to specific requirements.

The coolant itself can be chosen to correspond to individual requirements regarding cost, shelf life, activatability, and effectiveness. One possibility for doing this is using water as the coolant which, as it evaporates, draws heat from the environment and meets these requirements in an ideal fashion.

Other objects, advantages and novel features of the present invention will become apparent from the following detailed description of the invention when considered in conjunction with the accompanying drawings.

DETAILED DESCRIPTION OF DRAWINGS

Figure 1:
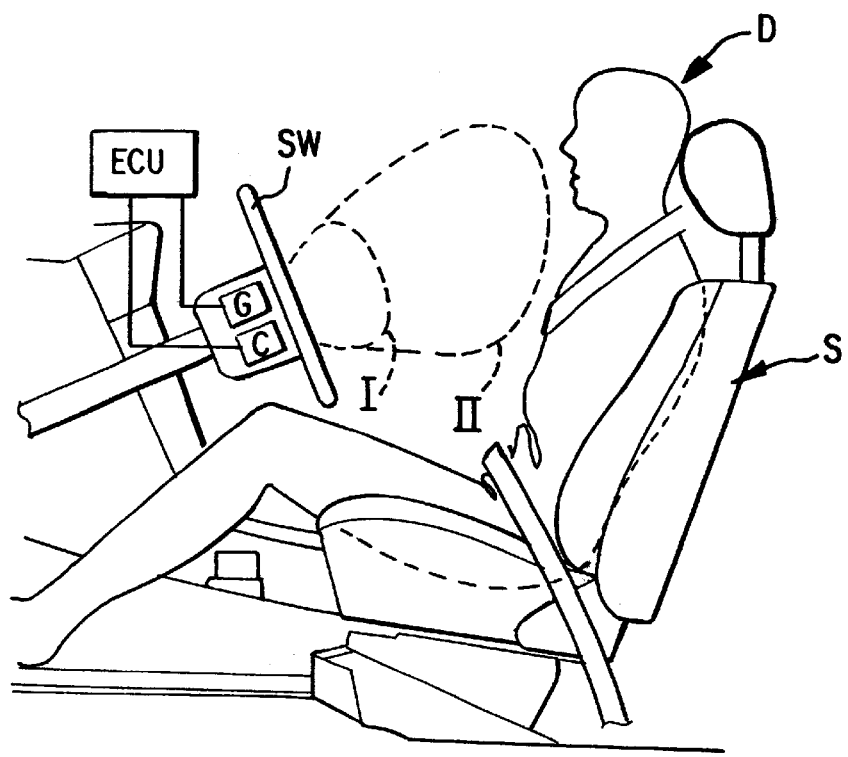
FIG. 1 is a schematic depiction of a system constructed and operated according to preferred embodiments of the present invention.

FIG. 1 schematically depicts a passenger or driver D situated in a vehicle seat S in front of a steering wheel SW. The vehicle is provided with a steering wheel airbag which is inflatable in two schematically depicted stages I and II. Inflation of the airbag is by way of a gas generator G controlled by electronic control unit U to apply inflation gases to the airbag to carry out the two step inflation depicted at I, II.

According to the invention, a schematically depicted coolant supply C is also provided and the introduction thereof to the gases of the gas generator G is controlled by an electronic control unit ECU. In preferred operations of the present invention, the coolant is introduced at the point in time when the second stage of the gas generator G is triggered.

Figure 2:
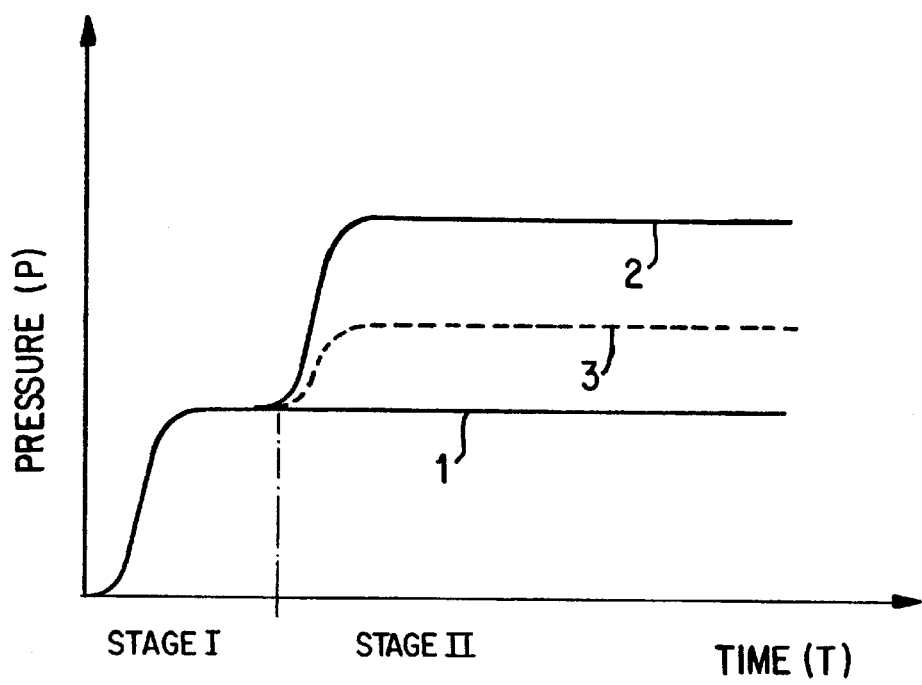
FIG. 2 is a graphical depiction of the airbag gas generator pressure versus time for the present invention as compared to systems without coolant introduction for controlling the inflation pressure.

FIG. 2 is a graph which schematically depicts the gas generator producing airbag inflating pressure P versus time T. The pressure curve 1 represents a conventional single-stage gas generator. Pressure curve 2 represents a two-stage gas generator. Pressure curve 3 depicts the operation according to the invention wherein coolant is introduced at the point in time when the second stage of the gas generator is triggered.

As can be seen from FIG. 2, the additional provision for controllably introducing a coolant during the inflation process adds a significant control parameter for controlling the inflating pressure of the airbag. This FIG. 2 depiction shows one preferred operating method, and it will be understood that the control of the coolant flow can be adapted to provide an ideal adjustment of the action of the airbag to specific requirements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for triggering an airbag provided with a gas generator controlled by a power control device, wherein a coolant is introduced as desired into the gas emerging from the gas generator in order to reduce the power developed by the gas generator.

2. Method according to claim 1, wherein the power is controlled by varying the beginning of the introduction of the coolant.

3. Method according to claim 2, wherein the power is controlled by varying the duration of the introduction of the coolant.

4. Method according to claim 3, wherein the power is controlled by introducing a variable quantity of coolant.

5. Method according to claim 2, wherein the power is controlled by introducing a variable quantity of coolant.

6. Method according to claim 1, wherein the power is controlled by varying the duration of the introduction of the coolant.

7. Method according to claim 6, wherein the power is controlled by introducing a variable quantity of coolant.

8. Method according to claim 1, wherein the power is controlled by introducing a variable quantity of coolant.

9. Method according to claim 1, wherein the gas generator is operated in two stages with a first stage at a first gas pressure and a second stage at a second higher gas pressure, and wherein said coolant is introduced at the start of the second stage.

10. An airbag system for a motor vehicle, comprising:

a inflatable airbag, a gas generator operable to supply inflating gases to the airbag, a coolant supply, and an electronic control unit operable to control the gas generator and coolant supply with supply of coolant to the inflating gases to thereby control the inflating behavior of the airbag.

11. An airbag system according to claim 10, wherein the electronic control unit is operable to operate the gas generator in two stages with a first stage at a first gas pressure and a second stage at a second higher gas pressure, and wherein said coolant is introduced at the start of the second stage.

\* \* \* \* \*